US012780674B2

(12) United States Patent
Ding et al.

(10) Patent No.: US 12,780,674 B2
(45) Date of Patent: Nov. 3, 2026

(54) METHOD FOR SYNTHESIS OF NANO-SIZED ZEOLITE Y

(71) Applicant: SAUDI ARABIAN OIL COMPANY, Dhahran (SA)

(72) Inventors: Lianhui Ding, Dhahran (SA); Faisal Alotaibi, Al Khobar (SA); Mohammad F Aljishi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 499 days.

(21) Appl. No.: 18/426,059

(22) Filed: Jan. 29, 2024

(65) Prior Publication Data

US 2025/0243074 A1 Jul. 31, 2025

(51) Int. Cl.

| | |
|---|---|
| ***C01B 39/02*** | (2006.01) |
| ***B01J 29/08*** | (2006.01) |
| ***B01J 35/45*** | (2024.01) |
| ***B01J 37/03*** | (2006.01) |
| ***B01J 37/04*** | (2006.01) |
| ***B01J 37/08*** | (2006.01) |
| ***B82Y 40/00*** | (2011.01) |
| ***C01B 39/24*** | (2006.01) |

(52) U.S. Cl.

CPC ........... *C01B 39/023* (2013.01); *B01J 29/084* (2013.01); *B01J 35/45* (2024.01); *B01J 37/036* (2013.01); *B01J 37/04* (2013.01); *B01J 37/08* (2013.01); *C01B 39/24* (2013.01); *B82Y 40/00* (2013.01)

(58) Field of Classification Search

CPC ...... C01B 39/023; C01B 39/24; B01J 29/084; B01J 35/45; B01J 37/036; B01J 37/04; B01J 37/08; B82Y 40/00; C01P 2004/62; C01P 2004/64

See application file for complete search history.

(56) References Cited

U.S. PATENT DOCUMENTS 10,252,917 B2 4/2019 Yuan et al.

FOREIGN PATENT DOCUMENTS

| | | | | |
|---|---|---|---|---|
| CN | 1331748 C | | 1/2002 | |
| CN | 101722023 B | | 6/2010 | |
| CN | 105314651 B | | 2/2016 | |
| CN | 113086988 B | | 7/2021 | |
| CN | 115594192 A | * | 1/2023 | ............ C01B 39/24 |
| DE | 1567894 C3 | | 3/1973 | |

OTHER PUBLICATIONS

Chaves et al.; A simple synthesis procedure to prepare nanosized faujasite crystals; Microporous and Mesoporous Materials 161 (2012) 67-75.

Reinoso et al.; Green synthesis of nanocrystalline faujasite zeolite; Ultrasonics—Sonochemistry 42 (2018) 303-309.

(Continued)

*Primary Examiner* — Anthony J Zimmer
*Assistant Examiner* — Jaanzeb C Raja
(74) *Attorney, Agent, or Firm* — Leason Ellis LLP

(57) ABSTRACT

The present disclosure is directed to methods of zeolite Y synthesis. Two-stage temperature crystallization methods are employed to synthesize nano-sized zeolite Y that possesses improved crystallinity, surface area, and pore volume compared to zeolite Y produced using alternative methods.

20 Claims, 4 Drawing Sheets

(56) References Cited

OTHER PUBLICATIONS

Rasouli et al.; Effect of nanocrystalline zeolite Na-Y on meta-xylene separation; Microporous and Mesoporous Materials 152 (2012) 141-147.
Ahmedzeki et al.; Synthesis and Characterization of Nanocrystalline Zeolite Y; Al-Khwarizmi Engineering Journal, vol. 12, No. 1, pp. 79-89 (2016).
Sang et al.; Synthesis of small crystals zeolite NaY; Materials Letters 60 (2006) 1131-1133.
Huang et al., "Synthesis of hierarchical porous zeolite NaY particles with controllable particle sizes", Microporous and Mesoporous Materials, Feb. 2010, pp. 167-175.
International Search Report and Written Opinion for corresponding PCT Application No. PCT/US2025/013325 dated Apr. 3, 2025 (9 pages).
Mendoza et al., "A systematic study on the synthesis of nanosized Y zeolite without using organic structure-directing agents: control of Si/Al ratio", Journal of Porous Materials, Springer US, New York, Mar. 2022, pp. 907-919.

* cited by examiner

METHOD FOR SYNTHESIS OF NANO-SIZED ZEOLITE Y

FIELD OF THE DISCLOSURE

The present disclosure relates to methods to nano-sized zeolite y and methods for synthesis thereof.

BACKGROUND OF THE DISCLOSURE

With the annual deterioration in crude oil properties, and increasing demand for clean fuel and petrochemicals, the need for conversion of heavy oils is increasingly important. Hydrocracking and fluidized catalytic cracking (FCC) are some of the most prevalent and efficient process for heavy oil conversion.

Zeolite Y is widely used in heavy oil conversion processes such as hydrocracking and FCC processes. These processes involve conversion of hydrocarbons from larger molecules to smaller molecules. A known drawback of zeolite Y is that the pore sizes are insufficient to permit larger molecules to diffuse therein and react proximate to active sites located inside those zeolite pores. Increased pore sizes and reduced zeolite particle sizes are effective ways to enhance mass transfer, and thus greatly improve the catalyst performances.

The catalyst used in the hydrocracking process has two main functions: cracking of high molecular weight hydrocarbons, and hydrogenating the unsaturated molecules. However, the small pore size of zeolite Y does not favor the large molecules in the heavy oil fraction to diffuse into the active sites located inside the zeolite. This causes low activity, and a possible deactivation of the catalyst.

In the FCC reactions, the heavier feedstock cannot enter the pores of the zeolite Y catalyst. As such thermal reactions are typically responsible for cracking larger molecules into smaller ones, and catalytic reactions occur with the thermally cracked compounds.

Zeolite Y (also known as Na—Y zeolite or Y-type faujasite zeolite) is a well known material for its zeolites have ion-exchange, catalytic and adsorptive properties. Zeolite Y is also a useful starting material for production of other zeolites such as ultra-stable y-type zeolite (USY). Like typical zeolites, faujasite is synthesized from alumina and silica sources, dissolved in a basic aqueous solution and crystallized. The faujasite zeolite has a framework designated as FAU by the International Zeolite Association, and are formed by 12-member ring structures and have channels of about 7.4 angstroms (Å). Faujasite zeolites are characterized by a 3-dimensional pore structure with pores running perpendicular to each other in the x, y, and z planes. Secondary building units can be positioned at 4, 6, 6-2, 4-2, 1-4-4 or 6-6. An example SAR range for faujasite zeolite is about 2 to about 6, typically with a unit cell size (units a, b and c) in the range of about 24.25 to 24.85 Å. Faujasite zeolites are typically considered X-type when the silica-to-alumina ratio (SAR) is at about 2-3, and Y-type when the SAR is greater than about 3, for instance about 3-6. The faujasite is in its sodium form and can be ion exchanged with ammonium, and the ammonium form can be calcined to transform the zeolite to its proton form.

Despite the known methods to produce zeolite Y, there remains a clear and long-standing need to provide zeolite Y in an economically and environmentally friendly manner, while minimizing particle size, to improve the catalytic activity thereof.

SUMMARY OF THE DISCLOSURE

Methods of zeolite Y synthesis are provided. Two-stage temperature crystallization method is employed to synthesize nano-sized zeolite Y that possesses improved crystallinity, surface area, and pore volume compared to zeolite Y produced using alternative methods.

In certain embodiments, a method for synthesis of nano-sized zeolite Y having a silica-to-alumina molar ratio of about 3-6, the method comprising: mixing precursors and reagents at a molar compositional ratio effective for zeolite Y, the precursors and reagents comprising water, a silica source, an aluminum source and an alkali metal cation source, in the absence of a structure directing agent, to form a gel; aging the gel for an aging time period of about 10-30 hours at an aging temperature of about 20-40° C.; thermally treating the gel subjected to aging to carry out crystallization in a two-stage process, the two-stage process comprising a first thermal treatment stage followed by a second thermal treatment stage, wherein a first time period of the first thermal treatment stage is about 8-24 hours, a first temperature of the first thermal treatment stage is about 50-70° C., a second time period of the second thermal treatment stage is about 8-24 hours, and a second temperature of the second thermal treatment stage is about 80-120° C.; and recovering the nano-sized zeolite Y, wherein particle sizes of the nano-sized zeolite Y are about 10-300 nanometers.

In certain aspects, the particle sizes of the nano-sized zeolite Y are about 10-150 nanometers. In certain aspects, the particle sizes of the nano-sized zeolite Y are about 10-100 nanometers. In certain aspects, the particle sizes of the nano-sized zeolite Y are about 30-100 nanometers. In certain aspects, the particle sizes of the nano-sized zeolite Y are about 30-90 nanometers.

In certain embodiments, aging the gel includes stirring. In certain embodiments, aging the gel includes stirring and is at atmosphere pressure or at autogenous pressure.

In certain embodiments, thermally treating the gel subjected to aging is in the absence of stirring. In certain embodiments, thermally treating the gel subjected to aging is in the absence of stirring and is at atmosphere pressure or at autogenous pressure.

In certain aspects, the aging time period is about 16-30 hours, the aging temperature is about 24-36° C., the first time period is about 8-20 hours, the first temperature is about 50-66° C., the second time period is about 8-20 hours, and the second temperature is about 90-120° C. In certain aspects, the aging time period is about 16-24 hours, the aging temperature is about 24-36° C., the first time period is about 8-16 hours, the first temperature is about 54-66° C., the second time period is about 8-16 hours, and the second temperature is about 95-120° C. In certain aspects, the aging time period is about 18-22 hours, the aging temperature is about 28-32° C., the first time period is about 10-14 hours, the first temperature is about 58-62° C., the second time period is about 10-14 hours, and the second temperature is about 95-105° C.

In certain embodiments, aging the gel includes stirring, thermally treating the gel subjected to aging is in the absence of stirring, the aging time period is about 18-22 hours, the aging temperature is about 28-32° C., the first time period is about 10-14 hours, the first temperature is about 58-62° C., the second time period is about 10-14 hours, and the second temperature is about 95-105° C.

In certain aspects, mixing is conducted at ambient temperature and pressure, at a rate of about 100-600 revolutions per minute, and for a mixing time of about 0.5-3 hours. In certain aspects, mixing is conducted at ambient temperature and pressure, at a rate of about 100-600 revolutions per minute, and for a mixing time of about 0.5-3 hours; and aging the gel includes stirring at a rate of about 100-600 revolutions per minute, thermally treating the gel subjected to aging is in the absence of stirring, the aging time period is about 18-22 hours, the aging temperature is about 28-32° C., the first time period is about 10-14 hours, the first temperature is about 58-62° C., the second time period is about 10-14 hours, and the second temperature is about 95-105° C.

In certain aspects, the precursors and reagents are provided at compositional ratios on a molar basis of $SiO_2/Al_2O_3$:about 10-20; $OH/SiO_2$:about 0.4-1.6; alkali metal cation/$SiO_2$:about 0.8-2.4; and $H_2O/SiO_2$:about 10-40. In certain aspects, the precursors and reagents are provided at compositional ratios on a molar basis of $SiO_2/Al_2O_3$:about 12-16; $OH/SiO_2$:about 0.5-0.9; alkali metal cation/$SiO_2$: about 1.1-1.8; and $H_2O/SiO_2$:about 14-30. In certain aspects, the precursors and reagents are provided at compositional ratios on a molar basis of $SiO_2/Al_2O_3$:about 14; $OH/SiO_2$: about 0.71; alkali metal cation/$SiO_2$:about 1.43; and $H_2O/SiO_2$:about 21.4.

In certain aspects, the silica source comprises colloidal silica, the alumina source comprises sodium aluminate and the alkali metal cation source comprises sodium hydroxide. In certain aspects, the silica source consists essentially of colloidal silica, the alumina source consists essentially of sodium aluminate and the alkali metal cation source consists essentially of sodium hydroxide.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figure 1:
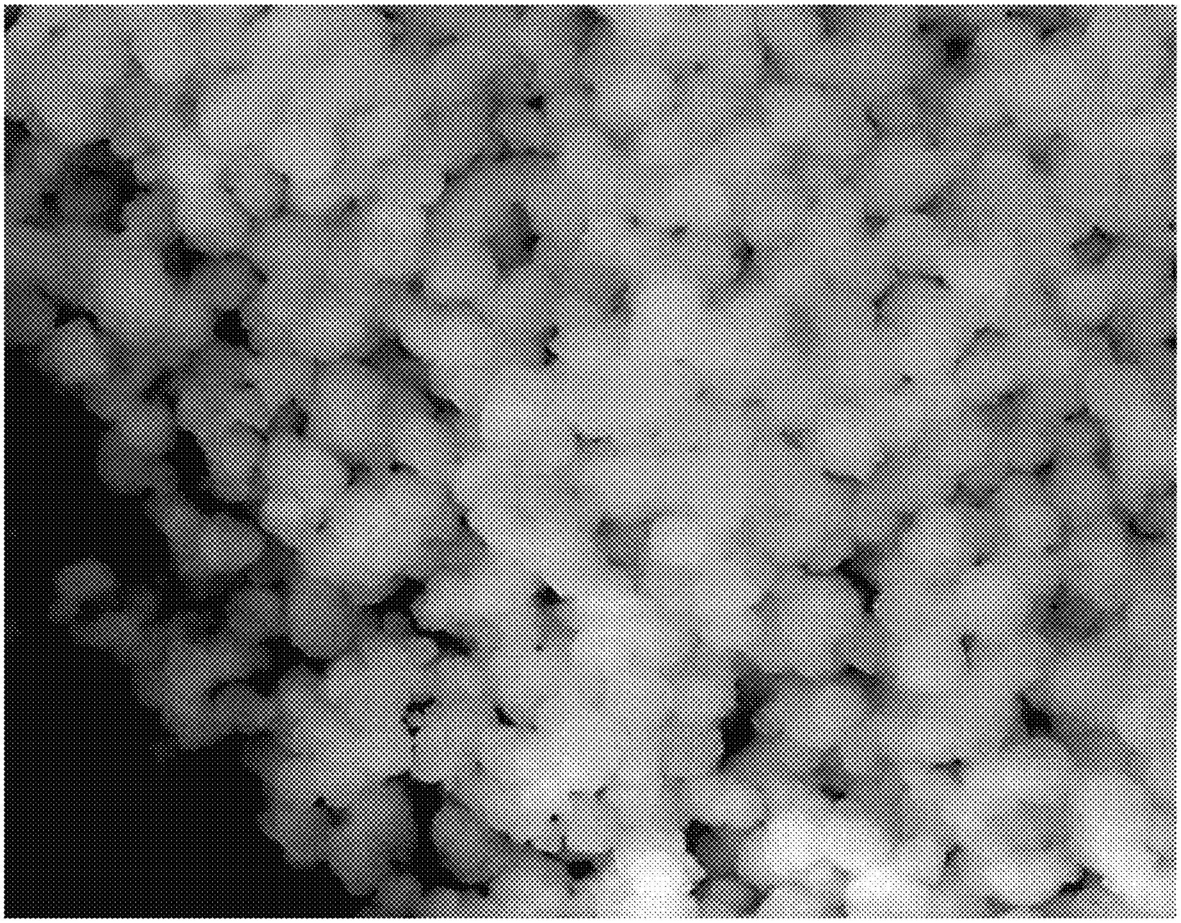
FIG. 1 is an SEM image of zeolite Y produced in Example 1 herein.

In the disclosure herein, a two-stage temperature crystallization method is employed to synthesize nano-sized zeolite Y. In the methods herein, a sol-gel process is carried in the absence of additional template materials and a seed gel. Conditions and time of crystallization are selected to improve scalability of the synthesis of zeolite Y particles having nanoscale dimensions.

Precursors and reagents are provided that are effective for synthesis of zeolite Y herein. In certain embodiments precursors and reagents effective for synthesis of zeolite Y comprise water, a silica source, an aluminum source, and an alkali metal cation source, in the absence of a structure directing agent. In certain embodiments precursors and reagents effective for synthesis of zeolite Y consist essentially of water, a silica source, an aluminum source and an alkali metal cation source. In certain embodiments precursors and reagents effective for synthesis of zeolite Y consist of water, a silica source, an aluminum source and an alkali metal cation source.

Effective compositional ratios for synthesis of zeolite Y as disclosed herein are provided to produce a homogeneous aqueous solution that forms into a gel, and crystallization of zeolite Y nanoparticles is carried out via controlled aging and two stages of thermal treatment temperature. Effective amounts of silica and alumina precursors are provided to produce synthesized zeolite Y having a silica-to-alumina ratio (SAR, mol/mol) in the synthesized zeolite in the range of about 3-6. In certain embodiments, approximate ranges or values of compositional ratios of the precursors and reagents produce zeolite Y herein include (on a molar basis): $SiO_2/Al_2O_3$:10-20, 12-20, 10-16, 12-16 or 14; $OH/SiO_2$:0.4-1.6, 0.5-1.6, 0.4-0.9, 0.5-0.9 or 0.71; $R/SiO_2$:0; alkali metal cation/$SiO_2$:0.8-2.4, 1.1-2.4, 0.8-1.8, 1.1-1.8 or 1.43; and $H_2O/SiO_2$:10-40, 14-40, 10-30, 14-30 or 21.4; wherein R is the structure directing agent, and a level of 0 represents absence of the structure directing agent. It is appreciated by those skilled in the art that these molar composition ratios can be expressed on a mass basis. In certain embodiments the alkali metal comprises sodium and the compositional ratios for an aqueous solution to synthesize nano-sized zeolite Y herein are 8-12 $Na_2O$:1 $Al_2O_3$:10-20 $SiO_2$:200-400 $H_2O$. In certain embodiments the alkali metal comprises sodium and the compositional ratios for an aqueous solution to synthesize nano-sized zeolite Y herein are 8-12 $Na_2O$:1 $Al_2O_3$:12-16 $SiO_2$:200-400 $H_2O$. In certain embodiments the alkali metal comprises sodium and the compositional ratios for an aqueous solution to synthesize nano-sized zeolite Y herein are 8-12 $Na_2O$:1 $Al_2O_3$:14 $SiO_2$:200-400 $H_2O$. In certain embodiments the silica source comprises colloidal silica or tetraethyl orthosilicate. In certain embodiments the silica source comprises colloidal silica. In certain embodiments, the silica source consists essentially of colloidal silica. In certain embodiments, the silica source consists of colloidal silica. In certain embodiments the alumina source comprises an aluminate including sodium aluminate ($NaAlO_2$), aluminum sulfate ($Al_2(SO_4)_3$), or aluminum nitrate ($Al(NO_3)_3$). In certain embodiments the alumina source comprises of sodium aluminate. In certain embodiments the alumina source consists essentially of sodium aluminate. In certain embodiments the alumina source consists of sodium aluminate. In certain embodiments the alkali metal cation source comprises sodium hydroxide (NaOH), potassium hydroxide (KOH) or lithium hydroxide (LiOH). In certain embodiments the alkali metal cation source comprises sodium hydroxide. In certain embodiments the alkali metal cation source consists essentially of sodium hydroxide. In certain embodiments the alkali metal cation source consists of sodium hydroxide.

As indicated in the compositional ratios above, an effective amount of water for the aqueous environment is provided. In the descriptions herein, it is understood that water is a necessary component of homogeneous aqueous mixtures from one or more of the sources of water, for example deionized and/or purified water. This water serves as a solvent during the sol-gel process and can be provided from one or more water sources, including purified water or deionized water that is added to form the homogeneous aqueous mixture, a water-containing silica source such as colloidal silica, an aqueous mixture of an alumina source and/or an aqueous mixture of the sodium source. These mixture components are usually added with water to the reaction vessel prior to heating. Typically, water allows for adequate mixing to realize a more homogeneous distribution of the components in the gel, which ultimately produces a more desirable product because each crystal is more closely matched in properties to the next crystal. Insufficient mixing could result in undesirable "pockets" of highly concentrated components, and this may lead to impurities in the form of different structural phases or morphologies.

The components are mixed for an effective time and under conditions suitable to form the homogeneous aqueous mixture in the form of a homogeneous gel. Mixing is typically carried out with a stirrer, for example, at a rate of about 100-600, 200-600, 300-600, 100-500, 200-500 300-500 revolutions per minute (rpm). The mixing steps can occur, for instance, at ambient temperature and pressure (for instance, room temperature in the range of about 20-22° C. and about 1 standard atmosphere). The mixing time can vary, for example, in the range of about 0.5-3, 0.5-2, 0.5-1.5 or 0.5-1 hours, so long as there is a sufficiently homogeneous distribution of the components in the gel to provide the homogeneous gel.

The chronological sequence of mixing can vary, with the objective being a highly homogenous distribution of the components in a homogeneous gel. In certain embodiments, the homogeneous gel is formed by: providing a source of alkali cations in an aqueous media, and combining a silica source and an alumina source. In certain embodiments, the homogeneous gel is formed by: combining the silica source and the alumina source in an aqueous media, and adding the add the source of alkali cations.

In the process herein, the gel is aged for an effective time period and under effective conditions before hydrothermal treatment. In certain embodiments, aging occurs for an effective time period that is in the range of about 10-30, 10-24, 10-22, 12-30, 12-24, 12-22, 14-30, 14-24, 14-22, 16-30, 16-24, 16-22, 18-30, 18-24 or 18-22 hours, for example about 20 hours. In certain embodiments, aging occurs at the effective time period at effective conditions including temperature that is in the range of about 20-40, 20-36, 20-32, 24-40, 24-36, 24-32, 28-40, 28-36 or 28-32° C., for example about 30° C., and at atmosphere pressure or at autogenous pressure (from the sol-gel or from the sol-gel plus an addition of a gas purge into the vessel prior to aging). In certain embodiments, aging is carried out with a stirrer, for example, at a rate of about 100-600, 200-600, 300-600, 100-500, 200-500 300-500 revolutions per minute (rpm).

The aged gel is crystallized by two thermal treatment stages, each at distinct temperatures, effective to produce the desired nano-sized zeolite Y. In certain embodiments the thermal treatment stages occur without stirring. A first thermal treatment stage is carried out at a temperature in the range of about 50-70, 50-66, 50-62, 54-70, 54-66, 54-62, 58-70, 58-66 or 58-62° C., for example about 60° C., at atmospheric or autogenous pressure (from the sol-gel or from the sol-gel plus an addition of a gas purge into the vessel prior to heating), and for a time period within the range of about 8-24, 8-20, 8-16, 8-14, 10-24, 10-20, 10-16 or 10-14 hours, for example about 12 hours. A second thermal treatment stage is carried out at a temperature in the range of about 80-120, 80-110, 80-105, 90-120, 90-110, 90-105, 95-120, 95-110 or 95-105° C., for example about 100° C., at atmospheric or autogenous pressure (from the sol-gel or from the sol-gel plus an addition of a gas purge into the vessel prior to heating), and for a time period within the range of about 8-24, 8-20, 8-16, 8-14, 10-24, 10-20, 10-16 or 10-14 hours, for example about 12 hours.

Such effective time and conditions result in the crystalline zeolite Y which is recovered. For example, the crystalline zeolite Y is formed as a precipitate (product) suspended in a supernatant (mother liquor). The precipitate, which includes the nano-sized zeolite Y herein, is recovered, for example by filtration, washing and drying. The products are washed, for example with water such as deionized water, at a suitable temperature such as about 20-80, 40-80, 20-60 or 40-60° C., at atmospheric pressure, under vacuum or under positive pressure. The wash can continue until the pH of the filtrate approaches about 7-9 or 8-9. The solids are recovered by filtration, for instance, using known techniques such as centrifugation, gravity, vacuum filtration, filter press, or rotary drums, and dried, for example at a temperature of about 90-150, 90-125, 90-115, 100-150, 100-125, 100-115 or 105-115° C., for example about 110° C., for about 8-24, 8-20, 8-16, 8-14, 10-24, 10-20, 10-16 or 10-14 hours, for example about 12 hours.

In certain embodiments, recovered precipitate is calcined at a suitable temperature, temperature ramp rate and for a suitable period of time. In certain embodiments, calcining is carried out to increase porosity. Calcination can occur under atmospheric pressure and at temperatures or end point temperatures in the range of about 400-600, 400-550, 400-525, 450-600, 450-500, 450-525, 475-600, 475-550 or 475-525, for example, about 500° C. Calcining can occur for about 3-10, 3-8, 3-6 or 3-5 hours, for example about 4 hours. Calcining can occur with ramp rates in the range of from about 0.1-10, 0.1-5, 0.1-3, 1-10, 1-5 or 1-3° C. per minute to the end point temperature. In certain embodiments calcination can have a first step ramping to a temperature of between about 100-150° C. (at ramp rates of from about 0.1-5, 0.1-3, 1-5 or 1-3° C. per min), maintaining for a holding time, and increasing to the end point temperature for the remainder of the calcination time.

The zeolite Y synthesized according to the process disclosed herein comprises FAU framework, in particular zeolite Y, having a micropore size related to the 12-member ring when viewed along the direction of 7.4×7.4 Å, and characterized by a 3-dimensional pore structure with pores running perpendicular to each other in the x, y, and z planes. The average particle dimensions of the zeolite Y synthesized according to the process disclosed herein include particles in the range of about 10-300, 20-300, 30-300, 40-300, 50-300, 10-150, 20-150, 30-150, 40-150, 50-150, 10-100, 20-100, 30-100, 40-100, 50-100, 10-90, 20-90, 30-90, 40-90 or 50-90 nanometers (nm).

The nano-sized zeolite Y produced using the two-stage temperature crystallization method herein possesses reduced particle size combined with improved crystallinity, surface area, and pore volume compared to zeolite Y produced using alternative methods. By employing the nano-sized zeolite Y produced using the two-stage temperature crystallization method herein, the effects of poor diffusion of bulky molecules are minimized or avoided, since the reduced particle size of zeolite Y results in increased overall external surface area, leading to more accessible active sites and shortened diffusion path of the molecules to enhance mass transfer. In addition, the reduced particle size of zeolite Y results in increased hydrothermal stability, and improved external surface of final zeolite product, which will display significant impact on the activity of selectivity of the catalyst. The reduced particle sizes results in an exponential increase in the zeolite external surface area, providing more active sites on the surface. Therefore, very large molecules that cannot diffuse inside the zeolite pores can easily access and react active sites for catalyzed conversion.

For example, by reducing the particle sizes of the key cracking component of the catalysts, the zeolite Y, large molecules in 540° C.+ residues, and other residues, can access active sites of zeolite Y, and thus are more readily converted to light fractions. These light fractions are useful as feeds for further downstream refining, such as for production of high quality fuels and for production of petrochemicals, such as in steam cracking processes to produce light olefins.

Advantageously, the methods herein can be carried out a lower cost, shorter synthesis time and with higher quality zeolite Y as compared to known processes. Furthermore, the process is readily scalable. The methods herein result in desirably small particle sizes, with high crystallinity, surface area and pore volume. This can be accomplished without a seeding step, without added template or structure directing agent, and with a more economical and process-friendly alumina source. Sodium aluminate as used in embodiments herein is less costly than aluminum isopropoxide as used in certain known processes. In addition, aluminum isopropoxide as used in certain known processes is hydrolyzed to produce isopropanol, which must be removed from the reaction system to avoid interfering with zeolite crystallization of the zeolite, adding additional steps and cost to synthesis along with additional waste product, isopropanol.

Without wishing to be bound by theory, a generalized idea for the mechanism of zeolite crystallization is that nucleation of individual particles precedes zeolite crystal growth. The nucleation phase results in discrete entities of the new phase to which nutrients attach allowing for zeolite growth that follows a classic S-shape crystallization curve.

EXAMPLES

Figure 2:
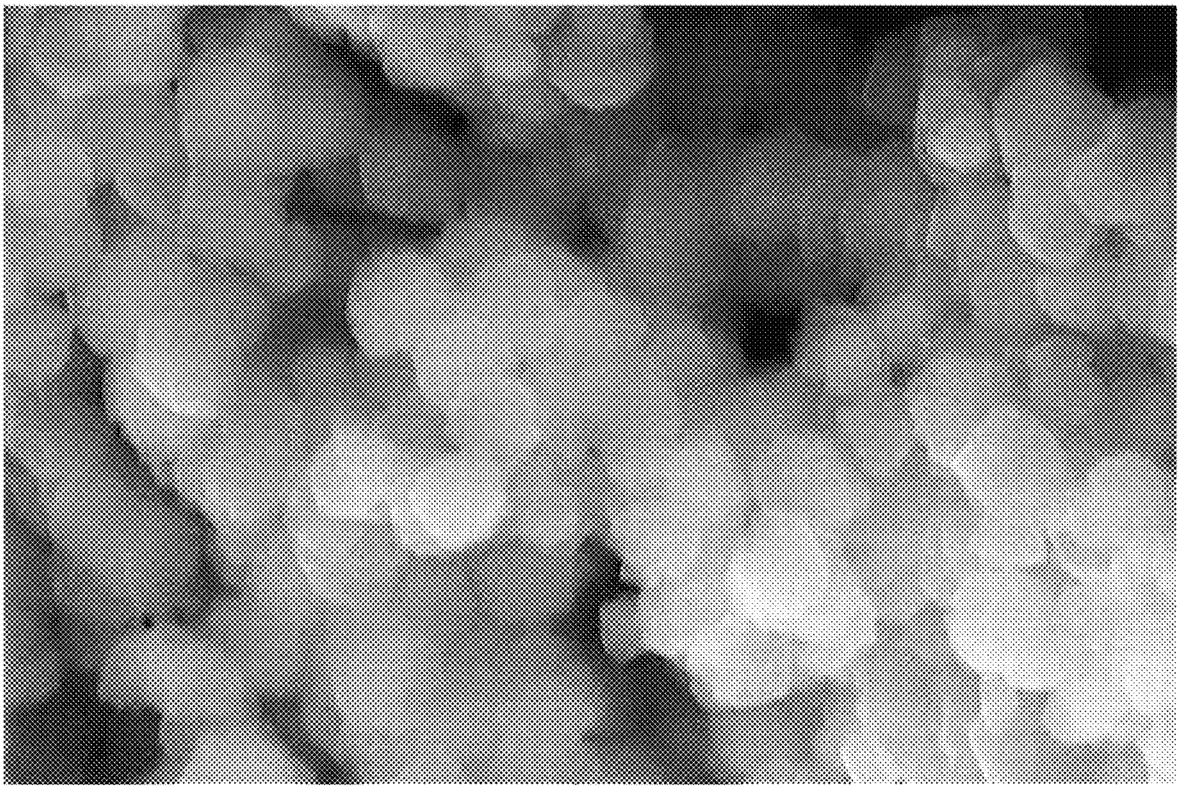
FIG. 2 is an SEM image of zeolite Y produced in Example 2 herein.
Figure 3:
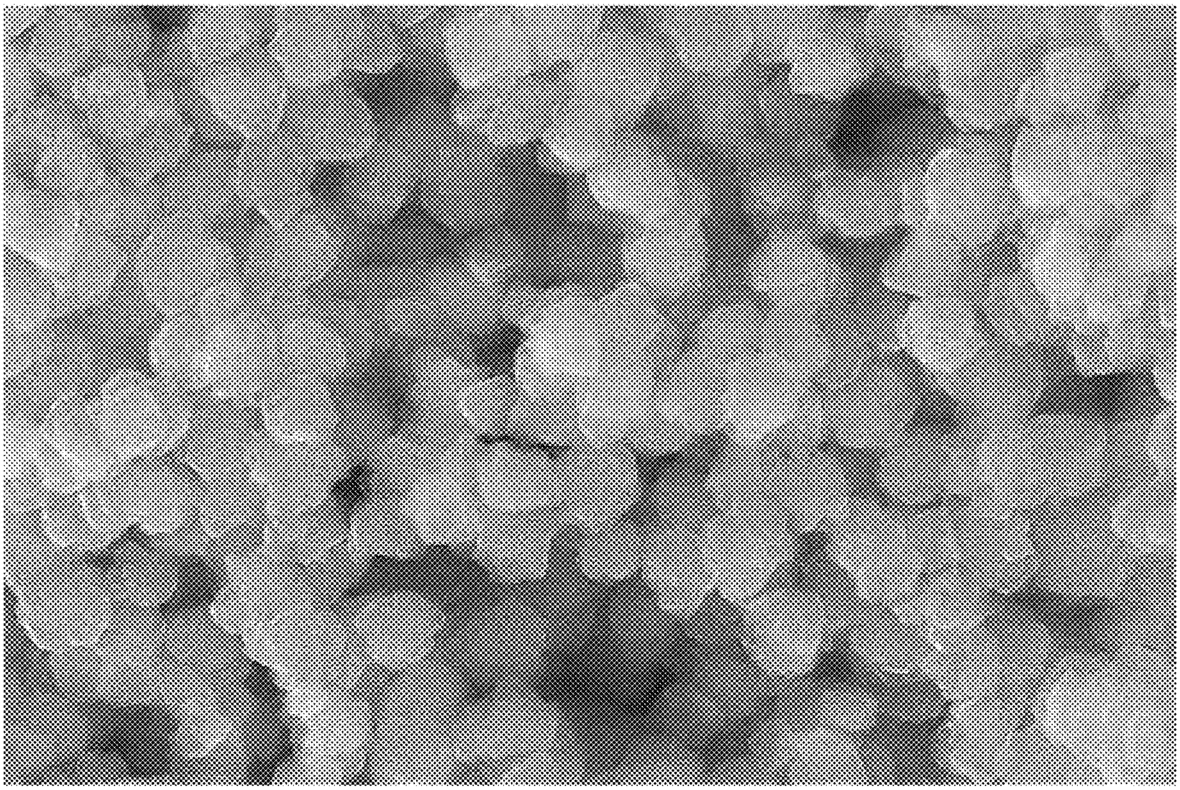
FIG. 3 is an SEM image of zeolite Y produced in Example 3 herein.
Figure 4:
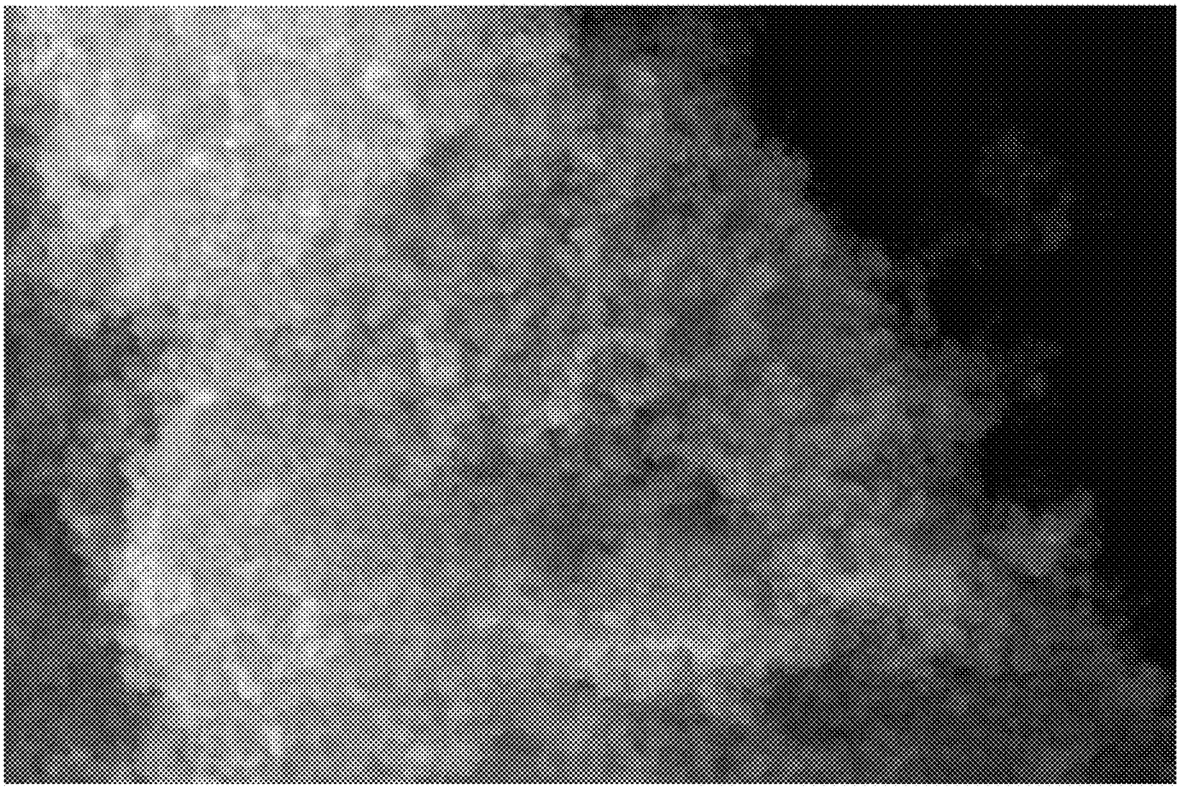
FIG. 4 is an SEM image of zeolite Y produced in Example 4 herein.

In the below examples, Scanning Electron Microscopy (SEM) images were obtained using a Quattro S ESEM (Thermo Fisher Scientific) with a scale of 1 μm as presented in FIGS. 1-4. These SEM images were used to determine the average particle dimensions according to known techniques with TopoMAPS software (Thermo Fisher Scientific). Data for surface area and pore volume was obtained by Brunauer-Emmett-Teller (BET) analysis. Product characterization was determined by X-Ray Diffraction, and relative crystallinity was determined by based on the sum of X-Ray Diffraction peak intensities of crystal planes (311), (511, 333), (440) (533), (642), (822, 660), (555, 751), (664), wherein CBV-100 zeolite Y from Zeolyst International (USA and NL) (zeolite NaY powder) was used as a reference with a crystallinity of 100%. SAR was determined by X-Ray Fluorescence for elemental analysis.

Example 1

In the first example, zeolite Y was synthesized using a process with a single stage of temperature crystallization. The compositional ratio of the components was 10 $Na_2O$:1 $Al_2O_3$:15 $SiO_2$:300 $H_2O$, on a molar basis To prepare the sample for evaluation, a mass of 68 grams (g) of sodium hydroxide (NaOH) and 392.4 g of purified water were added to a glass bottle and stirred until the NaOH is completely dissolved. The alumina and silica sources, 16.4 g of sodium aluminate ($NaAlO_2$) (Sigma Aldrich) and 210 g of 40 weight % colloidal silica (Ludox HS-40), were incorporated under stirring at a rate of 400 rpm for 1 hour to realize a homogeneous gel. The homogeneous gel was subjected to aging by maintaining under stirring at a rate of 400 rpm at 30° C. for 20 hours. The aged gel was crystallized at 60° C. for 24 hours without stirring. The products were filtrated and washed with water until a pH of about 8-9 was attained. The solids were dried at 110° C. for 12 hours. The dried solids were calcined at 500° C. for 4 hours (at a 2° C./min ramp starting at 20° C.).

The product was determined to be zeolite Y with a SAR of 5.1. A scanning electron microscope (SEM) image of the zeolite Y produced in Example 1 is provided in FIG. 1. Based on the SEM image it was determined that the average particle size was 229 nm. Relative crystallinity was determined to be 80%, the surface area was 587 meters squared per gram ($m^2/g$) and the pore volume was 0.78 milliliters per gram (ml/g).

Example 2

In the second example, the same process was followed as in Comparative Example 1, except that the aged gel was crystallized at 100° C. for 24 hours.

The product was determined to be zeolite Y with a SAR of 5.2. A SEM image of the zeolite Y produced in Example 2 is provided in FIG. 2. Based on the SEM image it was determined that the average particle size was 474 nm. Relative crystallinity was determined to be 92%, the surface area was 594 $m^2/g$ and the pore volume was 0.39 ml/g.

Example 3

In the third example, zeolite Y was synthesized using a process with two stages of temperature crystallization. The compositional ratio of the components was 10 $Na_2O$:1 $Al_2O_3$:15 $SiO_2$:300 $H_2O$, on a molar basis. To prepare the sample for evaluation, a mass of 68 g of NaOH and 392.4 g of purified water were added to a glass bottle and stirred until the NaOH is completely dissolved. The alumina and silica sources, 40.8 g of aluminum isopropoxide ($C_9H_{21}AlO3$) (Sigma Aldrich) and 210 g of 40 weight % colloidal silica (Ludox HS-40), were incorporated under stirring at a rate of 400 rpm for 1 hour to realize a homogeneous gel. The homogeneous gel was transferred to an autoclave for crystallization at 40° C. for 24 hours, followed by a second stage at 60° C. for 48 hours. The products were filtrated and washed with water until a pH of about 8-9 was attained. The solids were dried at 110° C. for 12 hours. The dried solids were calcined at 500° C. for 4 hours (at a 2° C./min ramp starting at 20° C.).

The product was determined to be zeolite Y with a SAR of 5.1. A SEM image of the zeolite Y produced in Example 3 is provided in FIG. 3. Based on the SEM image it was determined that the average particle size was 383 nm. Relative crystallinity was determined to be 85%, the surface area was 600 $m^2/g$ and the pore volume was 0.38 ml/g.

Example 4

In a fourth example, zeolite Y was synthesized using a process with aging and two stages of temperature crystallization. The compositional ratio of the components was 10 $Na_2O$:1 $Al_2O_3$:15 $SiO_2$:300 $H_2O$, on a molar basis. A two-stage temperature crystallization synthesis, with aging, was carried out. To prepare the sample for evaluation, a mass of 68 g of NaOH and 392.4 g of purified water were added to a glass bottle and stirred until the NaOH is completely dissolved. The alumina and silica sources, 16.4 g of sodium aluminate ($NaAlO_2$) (Sigma Aldrich) and 210 g of 40 weight % colloidal silica (Ludox HS-40), were incorporated under stirring at a rate of 400 rpm for 1 hour to realize a homogeneous gel. The homogeneous gel was subjected to aging under stirring at a rate of 400 rpm at 30° C. for 20 hours. The aged gel was transferred to an autoclave (without stirring) at 60° C. for 12 hours, followed by a second stage at 100° C. for 12 hours, for crystallization. The products were filtrated and washed with water until a pH of about 8-9 was attained. The solids were dried at 110° C. for 12 hours. The dried solids were calcined at 500° C. for 4 hours (at a 2° C./min ramp starting at 20° C.).

The product was determined to be zeolite Y with a SAR of 5.1. A SEM image of the zeolite Y produced in Example 4 is provided in FIG. 4. Based on the SEM image it was determined that the average particle size was 66 nm. Relative crystallinity was determined to be 109%, the surface area was 660 $m^2/g$ and the pore volume was 0.82 ml/g.

From the data, it is clear that the method of Example 4 produced the smallest particle size, with the highest crystallinity, surface area and pore volume. Advantageously, this was accomplished without seeding, without a template, and with a more economical and process-friendly alumina source (i.e., sodium aluminate compared to aluminum isopropoxide as in Example 3).

As used herein, "approximate," "approximately" or "about," as concerning the compositional ratios (molar or mass), temperature, pressure, and time recited herein for mixing, aging and crystallization, is within a margin of less than or equal to plus or minus 1, 2 or 5% of the value, unless otherwise stated.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for synthesis of nano-sized zeolite Y having a silica-to-alumina molar ratio of about 3-6, the method comprising:

mixing precursors and reagents at a molar compositional ratio effective for zeolite Y, the precursors and reagents comprising water, a silica source, an aluminum source and an alkali metal cation source, in the absence of a structure directing agent, to form a gel;

aging the gel for an aging time period of about 10-30 hours at an aging temperature of about 20-40° C.;

thermally treating the gel subjected to aging to carry out crystallization in a two-stage process, the two-stage process comprising a first thermal treatment stage followed by a second thermal treatment stage, wherein a first time period of the first thermal treatment stage is about 8-24 hours, a first temperature of the first thermal treatment stage is about 50-70° C., a second time period of the second thermal treatment stage is about 8-24 hours, and a second temperature of the second thermal treatment stage is about 80-120° C.; and recovering the nano-sized zeolite Y, wherein particle sizes of the nano-sized zeolite Y are about 10-300 nanometers.

2. The method as in claim 1, wherein the particle sizes of the nano-sized zeolite Y are about 10-150 nanometers.

3. The method as in claim 1, wherein the particle sizes of the nano-sized zeolite Y are about 10-100 nanometers.

4. The method as in claim 1, wherein the particle sizes of the nano-sized zeolite Y are about 30-100 nanometers.

5. The method as in claim 1, wherein the particle sizes of the nano-sized zeolite Y are about 30-90 nanometers.

6. The method of claim 1, wherein aging the gel includes stirring.

7. The method of claim 1, wherein aging the gel includes stirring and is at atmosphere pressure or at autogenous pressure.

8. The method of claim 1, wherein thermally treating the gel subjected to aging is in the absence of stirring.

9. The method of claim 1, wherein thermally treating the gel subjected to aging is in the absence of stirring and is at atmosphere pressure or at autogenous pressure.

10. The method of claim 1, wherein the aging time period is about 16-30 hours, the aging temperature is about 24-36° C., the first time period is about 8-20 hours, the first temperature is about 50-66° C., the second time period is about 8-20 hours, and the second temperature is about 90-120° C.

11. The method of claim 1, wherein the aging time period is about 16-24 hours, the aging temperature is about 24-36° C., the first time period is about 8-16 hours, the first temperature is about 54-66° C., the second time period is about 8-16 hours, and the second temperature is about 95-120° C.

12. The method of claim 1, wherein the aging time period is about 18-22 hours, the aging temperature is about 28-32° C., the first time period is about 10-14 hours, the first temperature is about 58-62° C., the second time period is about 10-14 hours, and the second temperature is about 95-105° C.

13. The method of claim 1, wherein aging the gel includes stirring, thermally treating the gel subjected to aging is in the absence of stirring, the aging time period is about 18-22 hours, the aging temperature is about 28-32° C., the first time period is about 10-14 hours, the first temperature is about 58-62° C., the second time period is about 10-14 hours, and the second temperature is about 95-105° C.

14. The method of claim 1, wherein mixing is conducted at ambient temperature and pressure, at a rate of about 100-600 revolutions per minute, and for a mixing time of about 0.5-3 hours.

15. The method of claim 1, wherein mixing is conducted at ambient temperature and pressure, at a rate of about 100-600 revolutions per minute, and for a mixing time of about 0.5-3 hours; and aging the gel includes stirring at a rate of about 100-600 revolutions per minute, thermally treating the gel subjected to aging is in the absence of stirring, the aging time period is about 18-22 hours, the aging temperature is about 28-32° C., the first time period is about 10-14 hours, the first temperature is about 58-62° C., the second time period is about 10-14 hours, and the second temperature is about 95-105° C.

16. The method of claim 1, wherein the precursors and reagents are provided at compositional ratios on a molar basis of $SiO_2/Al_2O_3$: about 10-20;

$OH^-/SiO_2$: about 0.4-1.6;

alkali metal cation/$SiO_2$: about 0.8-2.4; and $H_2O/SiO_2$: about 10-40.

17. The method of claim 1, wherein the precursors and reagents are provided at compositional ratios on a molar basis of $SiO_2/Al_2O_3$: about 12-16;

$OH^-/SiO_2$: about 0.5-0.9;

alkali metal cation/$SiO_2$: about 1.1-1.8; and $H_2O/SiO_2$: about 14-30.

18. The method of claim 1, wherein the precursors and reagents are provided at compositional ratios on a molar basis of $SiO_2/Al_2O_3$: about 14;

$OH/SiO_2$: about 0.71;

alkali metal cation/$SiO_2$: about 1.43; and $H_2O/SiO_2$: about 21.4.

19. The method of claim 1, wherein the silica source comprises colloidal silica, the alumina source comprises sodium aluminate and the alkali metal cation source comprises sodium hydroxide.

20. The method of claim 1, wherein the silica source consists essentially of colloidal silica, the alumina source consists essentially of sodium aluminate and the alkali metal cation source consists essentially of sodium hydroxide.

* * * * *